United States Patent
Chen

(10) Patent No.: US 11,307,798 B2
(45) Date of Patent: Apr. 19, 2022

(54) STORAGE DEVICE AND METHOD FOR PERFORMING MACRO COMMAND

(71) Applicant: SILICON MOTION, INC., Zhubei (TW)

(72) Inventor: Shu-Wei Chen, Taipei (TW)

(73) Assignee: SILICON MOTION, INC., Zhubei (TW)

(*) Notice: Subject to any disclaimer, the term of this patent is extended or adjusted under 35 U.S.C. 154(b) by 166 days.

(21) Appl. No.: 16/535,830

(22) Filed: Aug. 8, 2019

(65) Prior Publication Data

US 2020/0057584 A1    Feb. 20, 2020

Related U.S. Application Data

(60) Provisional application No. 62/719,908, filed on Aug. 20, 2018.

(30) Foreign Application Priority Data

Jan. 16, 2019   (TW) .................................. 108101642

(51) Int. Cl.
    *G06F 3/06*      (2006.01)

(52) U.S. Cl.
CPC .......... *G06F 3/0659* (2013.01); *G06F 3/0611* (2013.01); *G06F 3/0656* (2013.01); *G06F 3/0673* (2013.01)

(58) Field of Classification Search
CPC .... G06F 3/0659; G06F 3/0611; G06F 3/0656; G06F 3/0673
See application file for complete search history.

(56) References Cited

U.S. PATENT DOCUMENTS

| | | | |
|---|---|---|---|
| 6,119,204 A | 9/2000 | Chang et al. | |
| 8,417,839 B1* | 4/2013 | Ng | G06F 3/0611 |
| | | | 710/10 |

(Continued)

FOREIGN PATENT DOCUMENTS

| | | |
|---|---|---|
| TW | 201346755 A | 11/2013 |
| TW | I592865 B | 7/2017 |

(Continued)

OTHER PUBLICATIONS

O'Reilly; "Memory Mapping and DMA;" Apr. 7, 2019; available at: https://web.archive.org/web/20190407064247/https://www.oreilly.com/library/view/linux-device-drivers/0596005903/ch15.html (Year: 2019).*

(Continued)

*Primary Examiner* — Arpan P. Savla
*Assistant Examiner* — Richard L Sutton
(74) *Attorney, Agent, or Firm* — Birch, Stewart, Kolasch & Birch, LLP

(57) ABSTRACT

The present invention discloses a storage device including a memory module and a memory controller. The memory controller includes a memory interface control unit, a command queue, a selecting unit, a buffer and a processing unit. The processing unit is configured to perform: generating a plurality of macro commands by combining a plurality of sequences of memory operation commands; writing the macro commands into the buffer; writing one or more than one operation parameter of the macro command corresponding to a host command into the buffer according to the host command outputted from a host; commanding the selecting unit to select the buffer as an input terminal; and commanding the buffer to output the macro command corresponding to the host command.

10 Claims, 4 Drawing Sheets

(56) References Cited

U.S. PATENT DOCUMENTS

| | | | |
|---|---|---|---|
| 8,738,891 B1* | 5/2014 | Karandikar | G06T 1/20 |
| | | | 712/3 |
| 2005/0223172 A1 | 10/2005 | Bortfeld | |
| 2008/0294867 A1 | 11/2008 | Kimura | |
| 2008/0294986 A1* | 11/2008 | Seo | G06F 3/04817 |
| | | | 715/704 |
| 2010/0262721 A1* | 10/2010 | Asnaashari | G06F 3/067 |
| | | | 710/5 |
| 2015/0095615 A1* | 4/2015 | Abdallah | G06F 9/3834 |
| | | | 712/206 |
| 2015/0234601 A1* | 8/2015 | Tsai | G06F 3/061 |
| | | | 711/103 |
| 2016/0378493 A1 | 12/2016 | Burger et al. | |
| 2017/0075570 A1* | 3/2017 | Yoon | G06F 3/0611 |
| 2017/0228167 A1* | 8/2017 | Manohar | G06F 3/0688 |
| 2018/0024738 A1* | 1/2018 | Ngu | G06F 3/0659 |
| | | | 711/103 |
| 2018/0129415 A1 | 5/2018 | Igahara et al. | |
| 2018/0275917 A1* | 9/2018 | Iwai | G06F 12/04 |
| 2018/0341430 A1* | 11/2018 | Chiu | G06F 3/061 |
| 2019/0187929 A1* | 6/2019 | Srivastava | G06F 3/0659 |

FOREIGN PATENT DOCUMENTS

| | | | | |
|---|---|---|---|---|
| TW | I636399 B | | 9/2018 | |
| WO | WO-03005716 A1 * | | 1/2003 | ....... H04N 21/64322 |
| WO | WO 2012/040045 A2 | | 3/2012 | |

OTHER PUBLICATIONS

Taiwan Office Action and Search Report dated Dec. 10, 2019 for Application No. 107142242.

Taiwanese Office Action and Search Report, dated Jul. 9, 2020, for Taiwanese Application No. 108101642.

U.S. Office Action, dated Jul. 9, 2020, for U.S. Appl. No. 16/536,631.

* cited by examiner

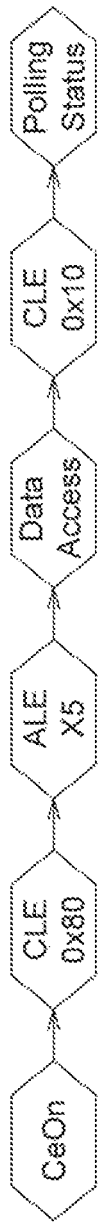

STORAGE DEVICE AND METHOD FOR PERFORMING MACRO COMMAND

This application claims the benefit of U.S. provisional application Ser. No. 62/719,908 filed Aug. 20, 2018 and Taiwan application serial No. 108101642, filed Jan. 16, 2019, the subject matter of which is incorporated herein by reference.

BACKGROUND OF THE INVENTION

Field of the Invention

The invention relates in general to a memory controller and an operating method thereof.

Description of the Related Art

Storage device is an indispensable component in a computer system. Generally speaking, the storage device mainly includes a memory module and a memory controller. The memory module includes a memory array and a control circuit. The memory array is such as a NAND flash memory array or a NOR flash memory array. The control circuit is configured to write data into or read data from the memory array. The memory controller serves as a control interface between the host controller and the control circuit of the memory module to receive a command from the host controller and further convert the received command into a signal that can be analyzed by the control circuit of the memory module. The increase in the command converting efficiency of the memory controller is beneficial to the increase in the overall efficiency of the storage device.

SUMMARY OF THE INVENTION

The invention is directed to a memory controller and an operating method thereof for increasing command converting efficiency and overall efficiency of the storage device.

According to one embodiment of the present invention, a storage device, including a memory module and a memory controller, is disclosed. The memory controller is coupled to the memory module, and includes a memory interface control unit, a command queue, a selecting unit, a buffer and a processing unit. The command queue is coupled to the memory interface control unit. The selecting unit is coupled to the command queue. The buffer is coupled to the selecting unit. The processing unit is coupled to the selecting unit and the buffer and configured to perform: generating a number of macro commands by combining a number of sequences of memory operation commands; writing the macro commands into the buffer; writing one or more than one operation parameter of the macro command corresponding to a host command into the buffer according to the host command outputted from a host; commanding the selecting unit to select the buffer as an input terminal; and commanding the buffer to output the macro command corresponding to the host command.

According to another embodiment of the present invention, a method for performing macro command is disclosed. The method is used in a storage device including a memory module and a memory controller. The method includes: generating a number of macro commands by combining a number of sequences of memory operation commands by a processing unit of the memory controller; writing the macro commands into a buffer of the memory controller by the processing unit; writing one or more than one operation parameter of the macro command corresponding to a host command into the buffer by the processing unit according to the host command outputted from a host; commanding a selecting unit of the memory controller to select the buffer as an input terminal by the processing unit; and commanding the buffer to output the macro command corresponding to the host command by the processing unit.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 4 is a schematic diagram of a sequence of memory operation commands corresponding to a data write command according to an embodiment of the present invention.

FIG. 5 is a schematic diagram of a macro command according to an embodiment of the present invention.

DETAILED DESCRIPTION OF THE INVENTION

Figure 1:
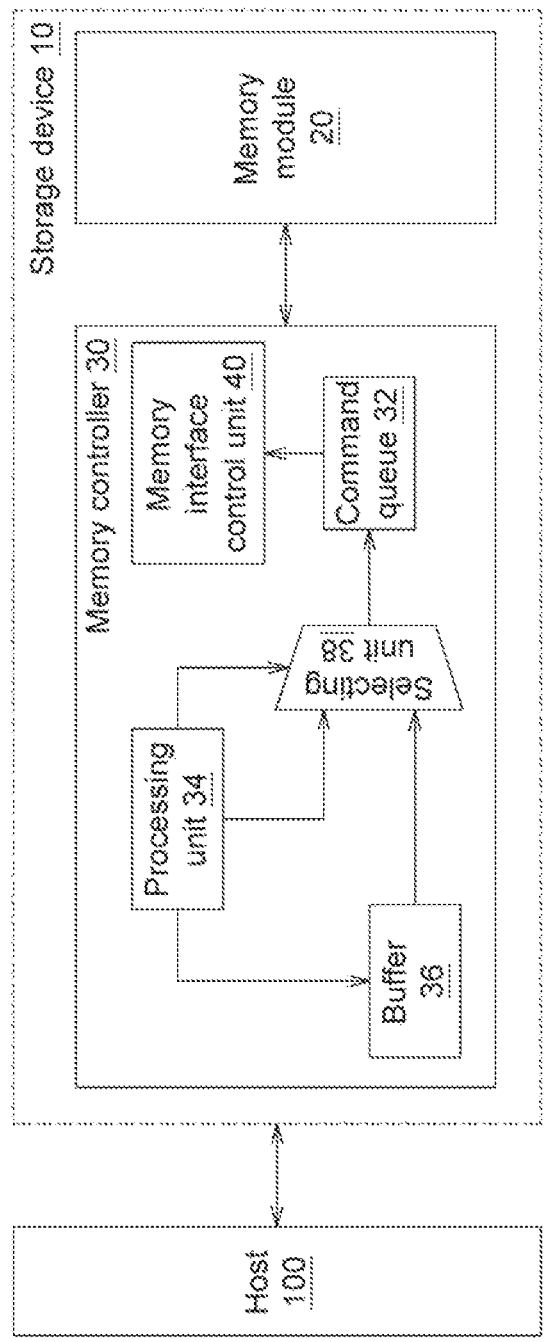
FIG. 1 is a block diagram of a storage device according to an embodiment of the present invention.

Referring to FIG. 1, a block diagram of a storage device according to an embodiment of the present invention is shown. In an actual example, the memory controller 30 of the storage device 10 accesses data stored in the memory module 20 according to a host command outputted from the host 100. For example, the user data outputted from the host 100 is stored to the storage space of the memory module 20. The host command complies with, for example, non-volatile memory express (NVMe) standard or advanced host controller interface (AHCI) standard, and can transmit data via a peripheral component interconnect express (PCIE) transmission interface, a serial ATA (SATA) transmission interface or a serial attached SCSI (SAS) transmission interface.

The memory module 20 preferably includes a memory having long-term data storage such as flash memory, magnetoresistive RAM, ferroelectric RAM, resistive RAM, and spin transfer torque-RAM (STT-RAM).

The memory controller 30 can be implemented by an integrated circuit chip. The memory controller 30 includes a command queue 32, a processing unit 34, a buffer 36, a selecting unit 38 and a memory interface control unit 40. Take the memory controller 30 adopting an NVMe command for example. When the NVMe command is a data read command or a data write command, the NVMe command includes information such as logic block address, logic block amount, and memory address. Take the NVMe command which is a data read command for example. The processing unit 34, after receiving the data read command, obtains physical address of the logic block according to the logical to physical mapping table (L2P mapping table) and then outputs a sequence of memory operation commands to the command queue 32. Then, the memory interface control unit 40 sequentially pops the memory operation command queued in the command queue 32, operates the memory module 20 according to a memory operation command to obtain the user data stored in the physical address, and transmits the obtained user data to the memory address designated by the data read command.

Figure 2:
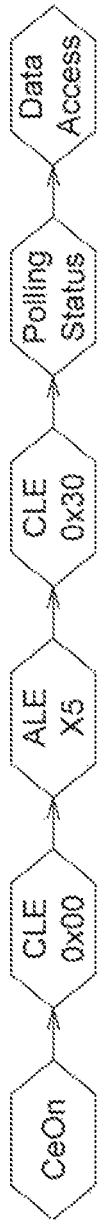
FIG. 2 is a schematic diagram of a sequence of memory operation commands corresponding to a data read command according to an embodiment of the present invention.

Let the flash memory be taken for example. The processing unit 34 outputs a sequence of memory operation commands to the memory interface control unit 40 to process a data read command. As indicated in FIG. 2, the sequence of memory operation commands includes a chip enable on (CeOn) command, a first command latch enable (CLE) command, an address latch enable (ALE) command, a second command latch enable command, a status read command, a data access command, and so on.

Some of the memory operation commands further include an operation parameter. For example, an initial command latch command further includes an operation parameter 0x00. Apart from outputting a command latch enable signal, the memory interface control unit 40 further outputs an operation parameter 0x00 to the memory module 20 at the same time. The address latch enable command further includes an operation parameter corresponding to the physical address. Meanwhile, the operation parameter has a length of 5 bits. Therefore, apart from outputting the address latch enable signal, the memory interface control unit 40 further sequentially outputs a 5-bit physical address value to the memory module 20, wherein the physical address is selected from an L2P mapping table. The second command latch enable command further includes an operation parameter 0x30. Therefore, apart from outputting the command latch enable signal, the memory interface control unit 40 further outputs an operation parameter 0x30 to the memory module 20 at the same time. The data access command preferably is a direct memory access (DMA) enable command which reads the user data cached on the cache page of the memory module 20.

When the memory module 20 is formed of a single memory chip, the chip enable on command may not require any operation parameter. When the memory module 20 is formed of a number of memory chips, the chip enable on command can use the operation parameter and the operation parameter is the code of the memory chip.

When the memory interface control unit 40 operates the memory module 20 according to the memory operation command, the memory interface control unit 40 can output an extra signal according to the memory operation command. For example, when the status read command is performed, the chip enable on command and the first command latch enable command are also performed.

After some of the memory operation commands are performed and completed, the signal enabled thereby will be disabled. For example, after the first command latch enable command and the second command latch enable command are performed and completed, the command latch enable command will be disabled. Conversely, after some of the memory operation commands are performed and completed, the signal enabled thereby continues to be enabled. For example, after the chip enable on command is performed and completed, the chip on enable signal continues to be enabled, and will not be disabled until the data access command is performed and completed.

Figure 3:
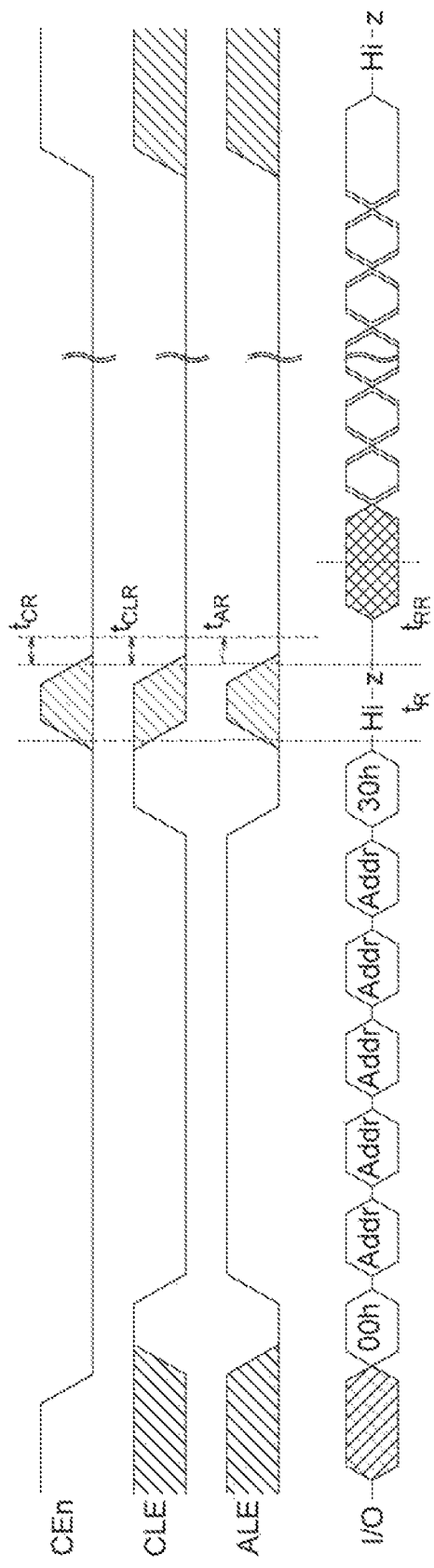
FIG. 3 is a timing diagram of a memory interface control unit performing a sequence of memory operation commands according to an embodiment of the present invention.

As indicated in FIG. 3, the memory interface control unit 40 performs a sequence of memory operation commands according to a pre-determined timing sequence. Or, the memory interface control unit 40 determines whether to perform the next memory operation command or terminate the sequence of memory operation commands according to the result of the current memory operation command.

When the NVMe command is a data write command, the processing unit 34 outputs a sequence of memory operation commands to the memory interface control unit 40 to write the user data into the physical address of the memory module 20. Meanwhile, a sequence of memory operation commands includes a chip enable on (CeOn) command, a first command latch enable (CLE) command, an address latch enable (ALE) command, a data access command, a second command latch enable command, a status read command, and so on. It can be known from what mentioned above, the sequence and operation parameter of the sequence of memory operation commands when the NVMe command is a data write command are different from that when the NVMe command is a data read command. For example, the operation parameter of the initial command latch command is 0x80; the operation parameter of the second command latch enable command is 0x10; the data access command is arranged before the second command latch enable command; the data access command preferably is a direct memory access (DMA) enable command which writes user data into the cache page of the memory module 20; the status read command is arranged at the last of the sequence of memory operation commands as shown in FIG. 4.

If the logic block amount of the NVMe command is greater than 1, the processing unit 34 will repeatedly output a sequence of memory operation commands to the memory interface control unit 40. However, there are only a few differences existing among all sequences of the memory operation commands. For example, the operation parameters corresponding to the physical address value are different. Under such circumstances, the processing unit 34 will repeatedly output similar memory operation commands to the memory interface control unit 40, not only resulting in poor efficiency but also consuming a large amount of system resources. Therefore, the present invention discloses a method for performing macro commands including a number of sequences of memory operation commands, wherein each sequence of memory operation commands corresponds to a data access command or corresponds to the processing of a logic block address in a data access command.

Figure 6:
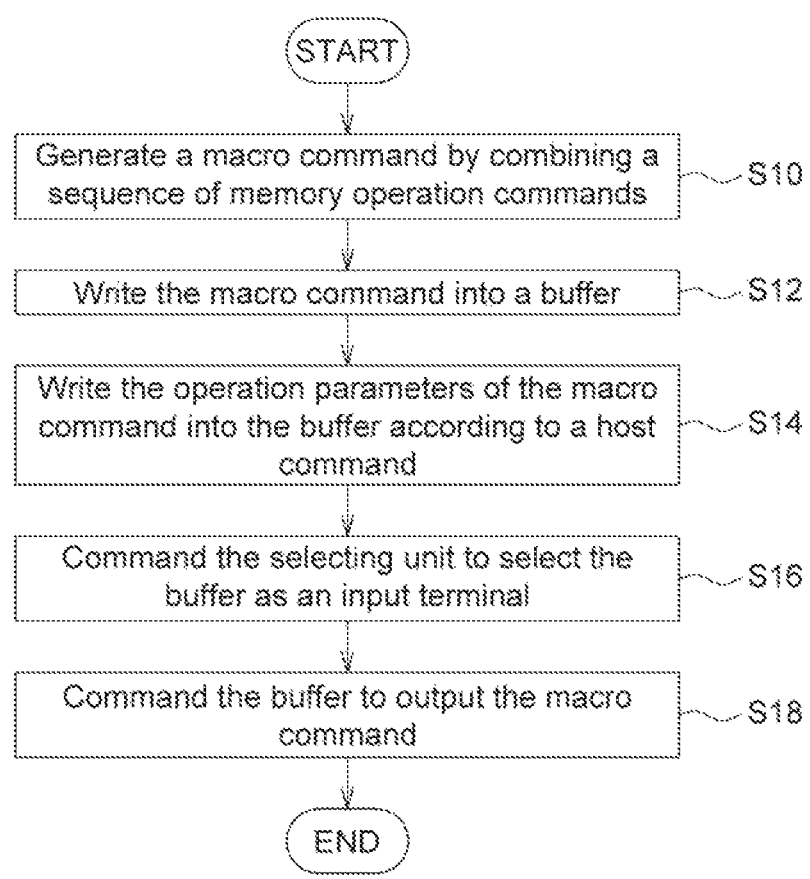
FIG. 6 is a flowchart of a method for performing macro command according to an embodiment of the present invention.

FIG. 5 is a schematic diagram of a macro command. The macro command includes a sequence of memory operation commands required for processing a data read command. FIG. 6 is a flowchart of a method for performing macro command of the present invention. The macro command used in the method for performing macro command of the present invention is exemplified by a data read command. The method for performing macro command of the present invention can also be used for performing various data access commands, and is not limited thereto.

As indicated in step S10, a macro command is generated by combining a sequence of memory operation commands, wherein the macro command includes a sequence of memory operation commands required for processing a data access command. As indicated in step S12, after the storage device 10 is booted, the macro command is written into the buffer 36 by the processing unit 34. In another embodiment, the processing unit 34 can change the macro commands stored in the buffer 36 at any time. For example, the processing unit 34 can increase or decrease the amount of macro commands and/or update the content or composition of existing macro commands.

As indicated in step S14, the operation parameters of the macro commands are written into the buffer 36 by the processing unit 34 according to a host command. The processing unit 34, after receiving the host command, determines the type of the host command. For example, if the host command is a data read command, the processing unit 34 firstly obtains the physical address of the logic block according to the L2P mapping table and then writes the operation parameters required by the memory operation commands (that is, the operation parameters required by the macro command) into the buffer 36.

As indicated in step S16, the selecting unit 38 is commanded by the processing unit 34 to select the buffer 36 as an input terminal. As indicated in step S18, the buffer 36 is commanded by the processing unit 34 to output a macro command, wherein the command includes an initial address and a length value equivalent to the length of the sequence of memory operation commands or equivalent to the size of the macro command. The buffer 36, after receiving the command outputted from the processing unit 34, starts to output a macro command or a sequence of memory operation commands satisfying the length value after the initial address. The sequence of memory operation commands is outputted to and queued in the command queue 32 via the selecting unit 38. The memory operation commands are preferably queued in a first-in-first-out (FIFO) mode. Lastly, the memory interface control unit 40 again sequentially pops and performs the queued sequences of memory operation commands. It can be known according to what is mentioned above, the processing unit 34, after commanding the buffer 36 to output the macro command, enters a power saving mode or processes the next host command without having to output the memory operation command one by one. Thus, system efficiency can be speeded or power consumption can be saved.

The macro command may further include a sequence of memory operation commands required for processing a data write command. The processing unit 34, after receiving the host command of the data write command, writes the operation parameters required for processing the memory operation command into the macro command, commands the selecting unit 38 to select the buffer 36 as an input terminal, and commands the buffer 36 to sequentially output a sequence of memory operation commands of the macro command. The initial address of the command is different from the initial address of the above command. The buffer 36 automatically and sequentially outputs a sequence of memory operation commands of the macro command, and the sequence of memory operation commands is further outputted to the command queue 32 via the selecting unit 38. Lastly, after the status read command is completed, the physical address included in the user data is updated to the L2P mapping table by the processing unit 34.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage device, comprising:
   a memory module; and
   a memory controller coupled to the memory module, and comprising:
   a memory interface control unit;
   a command queue, having an input terminal and an output terminal, wherein the output terminal of the command queue is coupled to the memory interface control unit;
   a selecting unit, having a first input terminal, a second terminal, a control terminal and an output terminal, wherein the output terminal of the selecting unit is coupled to the input terminal of the command queue;
   a buffet, having an input terminal and an output terminal, the output terminal of the buffer is coupled to the first terminal of the selecting unit; and
   a processing unit coupled to the second input terminal and the control terminal of the selecting unit and the input terminal of the buffer, and configured to perform:
   generating a plurality of macro commands by combining the plurality of sequences of memory operation commands;
   writing the macro commands into the buffer;
   writing one or more than one operation parameter of the macro command corresponding to a host command into the buffer;
   commanding the selecting unit to select the first input terminal of the selecting unit; and
   commanding the buffer to output the macro command corresponding to the host command so that the macro command is transmitted from the buffer to the command queue via the selecting unit, and the memory interface control unit acquires the macro command from the command queue and operates the memory module according to the macro command.

2. The storage device according to claim 1, wherein each of the sequence of memory operation commands corresponds to a data access command or corresponds to the processing of a logic block address of the memory module in the data access command.

3. The storage device according to claim 1, wherein the processing unit writes the macro commands into the buffer when the storage device is booted.

4. The storage device according to claim 1, wherein when the processing unit commands the selecting unit to select the buffer as an input terminal, the command outputted by the processing unit comprises an initial address and a length value equivalent to the length of the sequence of memory operation commands of the macro command corresponding to the host command or equivalent to the size of the macro command.

5. The storage device according to claim 1, wherein the command queue adopts a first-in-first-out queue mode.

6. A method for performing macro command, wherein the method is used in a storage device comprising a memory module and a memory controller, the method comprises:
   generating a plurality of macro commands by a processing unit of the memory controller by combining a plurality of sequences of memory operation commands;
   writing the macro commands into a buffer which has an input terminal coupled to the processing unit, by the processing unit;
   writing one or more than one operation parameter of the macro command corresponding to a host command into the buffer by the processing unit;
   commanding a selecting unit which has a first input terminal coupled to an output terminal of the buffer, a second terminal coupled to the processing unit and a control terminal coupled to the processing unit, to select the first terminal of the selecting unit; and commanding, by the processing unit, the buffer to output the macro command corresponding to the host command so that the macro command is transmitted from the buffer to a command queue which has an input terminal coupled to an output terminal of the selecting unit and an output terminal coupled to a memory interface control unit via the selecting unit, and the memory interface control unit acquires the macro command from the command queue and operates the memory module according to the macro command.

7. The method according to claim 6, wherein each of the sequence of memory operation commands corresponds to a data access command or corresponds to the processing of a logic block address of the memory module in the data access command.

8. The method according to claim 6, wherein the processing unit writes the macro commands into the buffer when the storage device is booted.

9. The method according to claim 6, wherein when the processing unit commands the selecting unit to select the buffer as an input terminal, the command outputted by the processing unit comprises an initial address and a length value equivalent to the length of the sequence of memory operation commands of the macro command corresponding to the host command or equivalent to the size of the macro command.

10. The method according to claim 6, wherein the macro command outputted from the selecting unit is queued in a command queue of the memory controller, and the command queue adopts a first-in-first-out queue mode.

\* \* \* \* \*